United States Patent
Radema et al.

(10) Patent No.: US 8,827,082 B2
(45) Date of Patent: Sep. 9, 2014

(54) APPARATUS FOR INSPECTING AND SORTING ARTICLES TRAVELING ON A CONVEYOR

(75) Inventors: Jeffrey Clark Radema, Calabogie (CA); John Lawrence, Ottawa (CA); Andrew Martin Peters, Ottawa (CA); Derek Carl Thorslund, Ottawa (CA)

(73) Assignee: Montrose Technologies Inc., Ottawa (CA)

( * ) Notice: Subject to any disclaimer, the term of this patent is extended or adjusted under 35 U.S.C. 154(b) by 1195 days.

(21) Appl. No.: 12/671,757

(22) PCT Filed: Aug. 1, 2008
(Under 37 CFR 1.47)

(86) PCT No.: PCT/CA2008/001416
§ 371 (c)(1),
(2), (4) Date: Oct. 28, 2011

(87) PCT Pub. No.: WO2009/015486
PCT Pub. Date: Feb. 5, 2009

(65) Prior Publication Data
US 2012/0085686 A1    Apr. 12, 2012

Related U.S. Application Data

(60) Provisional application No. 60/935,263, filed on Aug. 2, 2007.

(51) Int. Cl.
| B07C 5/00 | (2006.01) |
| B07C 5/342 | (2006.01) |
| B07C 5/38 | (2006.01) |
| B65G 47/08 | (2006.01) |
| B07C 5/34 | (2006.01) |

(52) U.S. Cl.
CPC ............ *B07C 5/3412* (2013.01); *B07C 5/3422* (2013.01); *B07C 5/38* (2013.01); *B65G 47/08* (2013.01); *Y10S 209/938* (2013.01)
USPC ............ 209/552; 209/580; 209/586; 209/938

(58) Field of Classification Search
USPC .................................... 209/552, 580, 586, 938
See application file for complete search history.

(56) References Cited

U.S. PATENT DOCUMENTS 4,168,005 A * 9/1979 Sandbank .................. 209/552
4,963,035 A * 10/1990 McCarthy et al. ............ 382/110

(Continued)

FOREIGN PATENT DOCUMENTS

WO          94/09920 A1    5/1994

*Primary Examiner* — Terrell Matthews
(74) *Attorney, Agent, or Firm* — Pearne & Gordon LLP

(57) ABSTRACT

There is provided an apparatus for grouping randomly oriented articles traveling on a conveyor, said conveyor having an in-feed end, an out-feed end and a predetermined width. The apparatus comprises an inspection head located in a fixed position above the conveyor, the inspection head for capturing images of the articles traveling on the conveyor, a grouping unit located in a fixed position relative to the conveyor and downstream of the inspection head and a control unit for receiving and processing the captured images from the inspection head. The grouping unit comprises a plurality of individually controllable pins, the individually controllable pins each moveable between a buffering position wherein the pin arrests movement of an article in alignment with the pin and a grouping position wherein the pin allows the article to move to a grouping location. The processing of the captured images for identifying the location of the articles traveling on the conveyor and for controlling the individual activation of the pins between buffering position and the grouping position.

19 Claims, 9 Drawing Sheets

(56) References Cited

U.S. PATENT DOCUMENTS

| | | | |
|---|---|---|---|
| 5,092,470 A * | 3/1992 | Hakansson | 209/586 |
| 5,197,607 A * | 3/1993 | Hakansson | 209/586 |
| 5,318,173 A * | 6/1994 | Datari | 209/580 |
| 5,409,119 A | 4/1995 | Datari | |
| 2005/0099620 A1 | 5/2005 | De La Ballina et al. | |

* cited by examiner

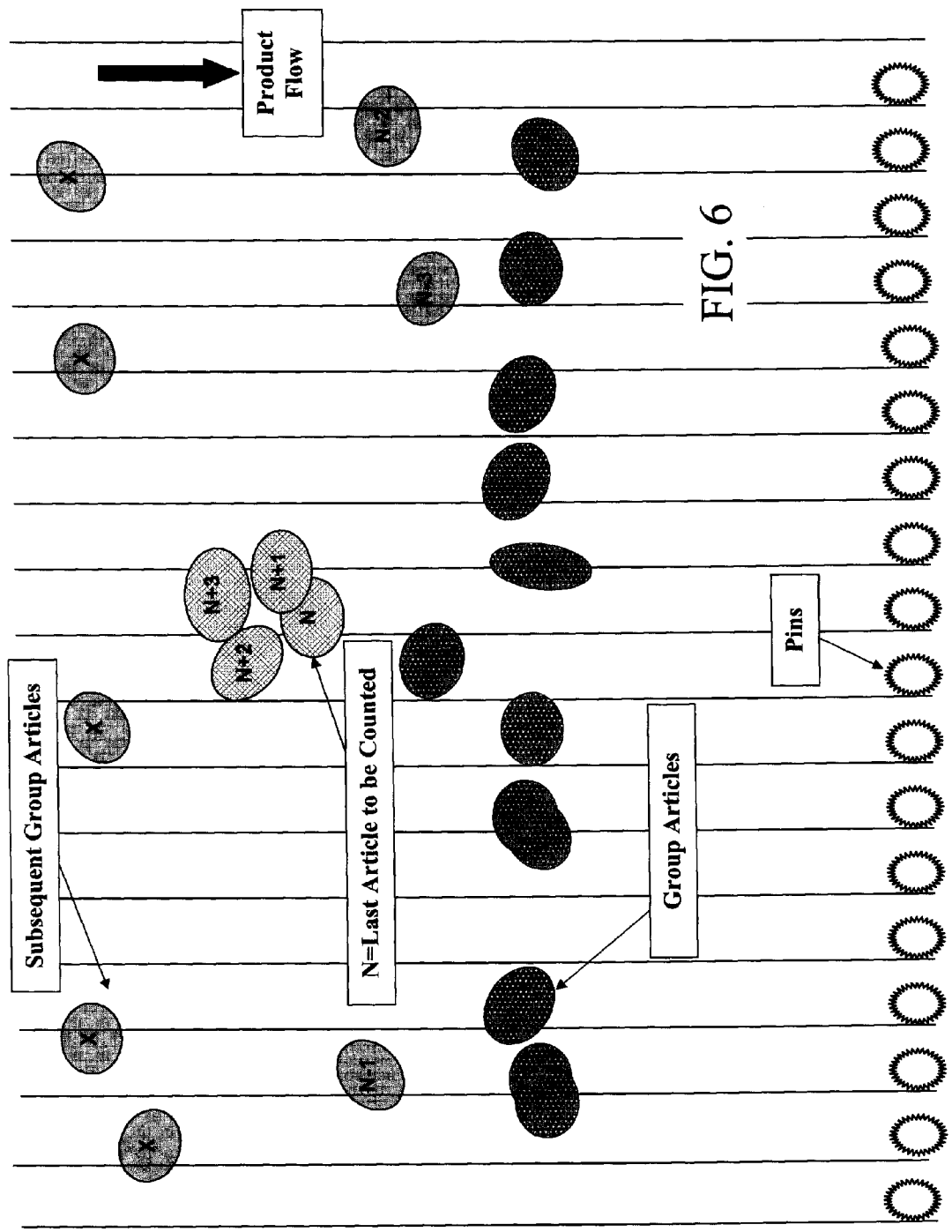

APPARATUS FOR INSPECTING AND SORTING ARTICLES TRAVELING ON A CONVEYOR

CROSS-REFERENCE TO RELATED APPLICATIONS

This invention claims priority from U.S. Provisional patent application No. 60/935,263 filed Aug. 2, 2007, the entire contents of which are incorporated herein by reference.

TECHNICAL FIELD

The invention relates to apparatus for inspecting and grouping articles traveling on a conveyor and, more particularly to an apparatus for inspecting and grouping articles that are randomly oriented on the conveyor.

BACKGROUND ART

In order to facilitate packaging of mass produced articles, such as frozen goods, into counted groups preparatory to placing the articles into cartons or bags containing a known number of articles, it is known to segregate such articles into a single-file stream to enable accurate counting and grouping. Such counting and grouping can then be performed by traditional means using simple beam interruption counters or the like and simple activated gates or valves. Such apparatus is well known.

Typically, such apparatus may be used with an inspection system, an example of which was disclosed by De La Ballina in United States published patent application No. 2005099620, which uses known techniques with regard to imaging and metrology with cameras, overhead lighting and backlighting. The De La Ballina system has a row of hinged fingers operating selectively in drawbridge fashion. When in a lowered condition, the fingers generally lie in the plane of the conveyor to allow accepted articles to pass from the first conveyor to an out-feed conveyor and, when in a raised condition, allow rejected articles to drop through the resulting gap for disposal. Different sets of the fingers can be raised together to select specific lines of articles for rejection.

Known imaging systems for inspecting articles on a conveyor are not entirely satisfactory where a high proportion of articles are randomly distributed and/or in clusters, i.e., touching, partially overlapping or interlocked together, since it is then difficult to determine whether or not a particular article meets the prescribed criteria for acceptance or rejection. Consequently, De La Ballina's system employs equipment upstream of the imaging system to segregate the articles from each other so that the imaging system can differentiate between them and determine which articles are to be rejected and the particular set of fingers to raise in order to drop only the rejected articles below the conveyor for disposal. A disadvantage of such an arrangement, however, is that the additional upstream equipment increases cost.

A further disadvantage arises when it is required to separate the acceptable articles into groups or batches of a prescribed number for packaging or further processing. Thus, De La Ballina's system or the like would require equipment downstream of the fingers for counting the accepted articles and separating them into groups for packaging. The counting and grouping equipment typically requires singulating the articles so that they follow one another in a single line, with each article being separated from the others. In addition to the disadvantage of the requirement of additional equipment, this type of equipment makes grouping of articles by parameters other than the number of articles per group difficult.

Such downstream equipment would further increase cost. Yet another disadvantage of such a system having separate pieces of equipment is that it is unlikely to be capable of rapid changeover to handle articles of different shapes and/or sizes.

SUMMARY OF INVENTION

An object of the present invention is to overcome or at least mitigate one or more of the disadvantages of such known systems; or at least provide an alternative.

According to one embodiment of the invention, there is provided an apparatus for grouping randomly oriented articles traveling on a conveyor, said conveyor having an in-feed end, an out-feed end and a predetermined width. The apparatus comprises an inspection head located in a fixed position above the conveyor, the inspection head for capturing images of the articles traveling on the conveyor, a grouping unit located in a fixed position relative to the conveyor and downstream of the inspection head and a control unit for receiving and processing the captured images from the inspection head. The grouping unit comprises a plurality of individually controllable pins, the individually controllable pins each moveable between a buffering position wherein the pin arrests movement of an article in alignment with the pin and a grouping position wherein the pin allows the article to move to a grouping location. The processing of the captured images for identifying the location of the articles traveling on the conveyor and for controlling the individual activation of the pins between buffering position and the grouping position.

The acceptable and rejected labeling of articles might, for example, identify articles for rejection and, possibly, subsequent disposal. Alternatively the labeling may correspond to different grades of article i.e., articles not acceptable for a first grade are not necessarily rejected outright and disposed of. Articles labeled as accepted may be further grouped together into separate groupings.

A predetermined criteria may be used in labeling articles and may measures compliance of the article with a particular size, colour, or other qualitative measures, or combination thereof.

A benefit of such an arrangement is that the same system not only sorts the articles into categories but also sorts articles in a particular category into batches or groups having a predetermined value i.e. count, volume or predicted weight.

According to another aspect of the present invention, apparatus for inspecting and sorting articles traveling on a conveyor comprises an imaging system for acquiring images of articles on the conveyor within a field of view of the imaging system, selection means for sorting corresponding articles after images thereof have been acquired, and control means for processing image data from the imaging system and controlling the selection means to sort the articles according to whether or not the corresponding image of each article meets predetermined criteria, wherein the imaging system is arranged to identify sets of images forming clusters, said clusters having characteristics predetermined as compromising the determination as to whether or not at least one of the articles in the cluster meets the predetermined criteria, and determine whether or not the cluster of articles is to be excluded from the determination.

Where, for example, the identified cluster has such a size and location that the group cycle value of the articles of the cluster would require assignment of articles in the cluster to different groups, and physical separation of the clustered articles is not possible or unlikely to be possible, the control means may be arranged to either categorize articles located upstream of the cluster into a current grouping and categorizing the cluster of articles into a separate subsequent grouping, or categorize articles that are between the cluster and the pins into the separate subsequent groupings and categorizing the cluster of articles into the current grouping.

Where articles on the conveyor are clustered so as to compromise the determination as to whether or not the articles in the cluster meet the predetermined criteria for labeling as acceptable or rejected, the control means may accept or reject the entire cluster. In doing so, the control means may predicate the decision to accept or reject the cluster upon a confidence metric determined from features of the cluster image, for example area or volume.

According to a further aspect of the present invention, apparatus for inspection, sorting, quantifying (i.e. count, volume or predicted weight) and grouping of articles traveling on a conveyor substantially simultaneously comprises:
(i) an optical inspection device having imaging means;
(ii) grouping system for grouping articles into separate subsequent groupings; and
(iii) a control unit for processing images from the imaging system and controlling the grouping The imaging means may capture images of articles on the conveyor, the control means may capture and process image data from the imaging means and, in dependence thereupon, control the selection means to select acceptable articles meeting specified criteria and reject unacceptable articles that do not meet such criteria. The control means may receive image data for each article from the imaging means and determines for each article from the image thereof the numerical position of the article in a current count, positional alignment of the article relative to neighbouring articles and/or physical reference point, and whether the article is acceptable or unacceptable according to prescribed criteria, such as surface area or volume, and controls the selection means not only to reject said unacceptable articles but also to sort the acceptable articles based upon spatial criteria into groups of a preset number.

In embodiments of any of the foregoing aspects of the invention, the grouping means may comprise storage means for temporarily storing accepted articles which were not selected to make up the current group and releasing the stored accepted articles for inclusion in the next group.

The selection means preferably is configured to intercept articles launched from the conveyor with a free fall ballistic trajectory and to reject selected articles while said articles are in flight, conveniently by displacing the rejected articles from the flight path, for example by means of a suitably-timed blast from an airjet, so that the rejected articles are collected separately from the accepted articles, perhaps in a reject hopper. The timing of the air blasts are derived from the imaging system according to spatial location of the articles on the conveyor, that is the position of articles along the width of the conveyor, distance from the imaging system sensor (camera) to the airjet and speed of the conveyor.

In preferred embodiments of the invention wherein the articles are intercepted during free fall flight, the articles preferably follow a ballistic trajectory and are accurately tracked by the processing of the captured images regardless of articles touching, partially overlapping (being shingled) or interlocked together.

Accepted articles may be collected in a buffer hopper having a gating means, for example retractable rods or pins, that may closie an outlet of the buffer hopper selectively to pass some articles and collect others while determining a group count and for closing a buffer hopper outlet fully once the group count is reached.

Once the buffer hopper has been closed completely, the control means assigns the articles in the buffer hopper to the next group, continues the count or overall article volume, or overall predicted weight as before re-opens the gating means after a preset time interval and, when the count nears the prescribed total, repeats the process of differentiating clusters, and so on.

Allowing articles to accumulate in the buffer hopper for a preset time interval allows a container containing a previously established group to be replaced by a new container for the next group.

In one embodiment of the invention, the imaging and control means create a virtual plan of successive groups of articles passing along the conveyor, identifies and labels in the virtual image those articles that are rejected, defines those articles that are accepted by for example, count, article volume or article predicted weight and control downstream grouping means to segregate successive groups of articles. As the set group cycle quantity approaches the required amount, the inspection head determines which articles are categorized for inclusion in the current group and which articles are categorized for inclusion in the subsequent group. A pin activation profile is established to activate individual pins at the correct time in order to separate articles of the current group from those of the subsequent group. The pin activation profile is automatically adjusted to account for any articles that may have been labeled for rejection, and would therefore have been removed from the product stream of articles. The pins may be extended within the buffer hopper in time synchronization with the pin activation profile to stop those articles categorized for the subsequent group, yet allow those destined for the current group to pass through unimpeded, past other pins that are in a grouping position, onto the out-feed conveyor or container. As soon as all pins have been extended, thus entrapping those articles destined for the subsequent group, a timed period commences during which all product entering the buffer hopper is entrapped. During this period no article is deposited onto the out-feed conveyor or container thus establishing a gap between groups.

Typically containers into which articles are poured are changed over during the time created by the gap, thus ensuring that an exact quantity of acceptable articles, are deposited into each container or spare space on the out-feed conveyor.

At the end of the timed period all pins retract thus depositing those articles destined for the subsequent group onto the spare space on the out-feed conveyor or directly to a new container. At this juncture a new grouping cycle commences.

BRIEF DESCRIPTION OF DRAWINGS

In the drawings, identical or corresponding elements in the different Figures have the same reference numeral.

FIG. 6 depicts free-falling articles above a row of selector pins; and

DESCRIPTION OF PREFERRED EMBODIMENTS

The apparatus described herein allows for the articles passing along a conveyor to be grouped into subsequent groups that each satisfy a predetermined parameter for the group. The predetermined parameter for the group may be, for example, the number of articles in each group. In this case, the apparatus can separate the articles into subsequent groupings, each with the appropriate number of articles, without requiring the articles be singulated. Instead of grouping the articles based on the number of articles per grouping, the predetermined parameter may instead be selected to separate the articles into groups based on, for example, the total volume of the articles or the total weight of the articles. Although described separately in the following description, a combination of predetermined parameters can be used for the groupings, for example the groupings may be set to X articles or Y kilograms per grouping In addition to separating the articles into subsequent groups that each meet a predetermined parameter, the apparatus may also label the articles for grouping, in which case the articles are separated into subsequent groups, or for diverting, in which case the articles are diverted from the grouping articles, for example to a rejection bin. The diverting of the articles may be based on the characteristics of the article, for example its size, shape, colour, etc as well other characteristics, such as the presence or absence of certain features. For example, if the apparatus is used to sort frozen baked goods, any baked goods that are not of a certain size (for example broken goods) and colour (for example burnt goods) may be categorized for diverting. The articles 28 that aren't diverted are then grouped into subsequent groupings.

Figure 1:
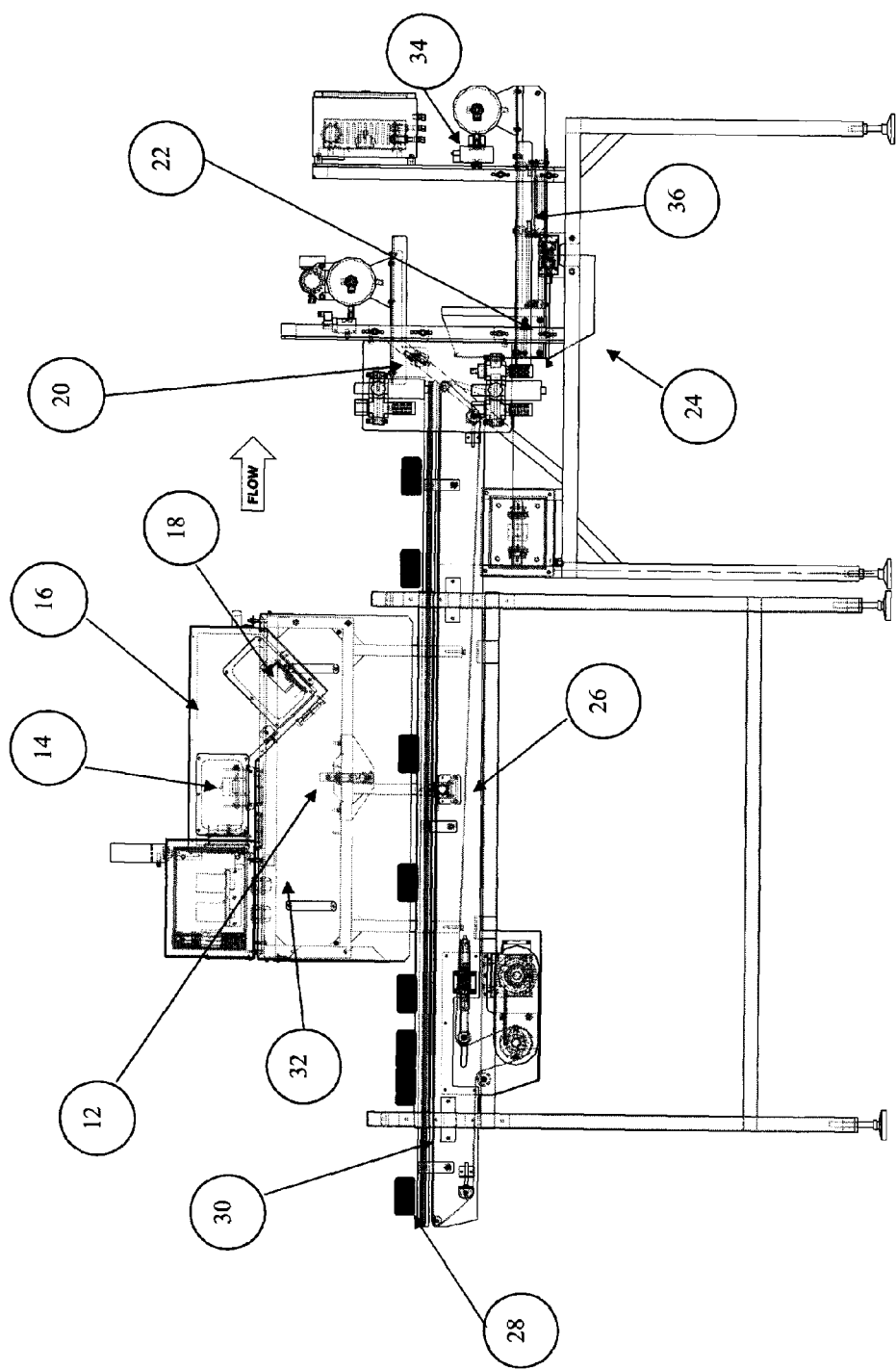
FIG. 1 is a side elevation of apparatus for inspecting, sorting and counting of articles traveling on a conveyor.
Figure 2:
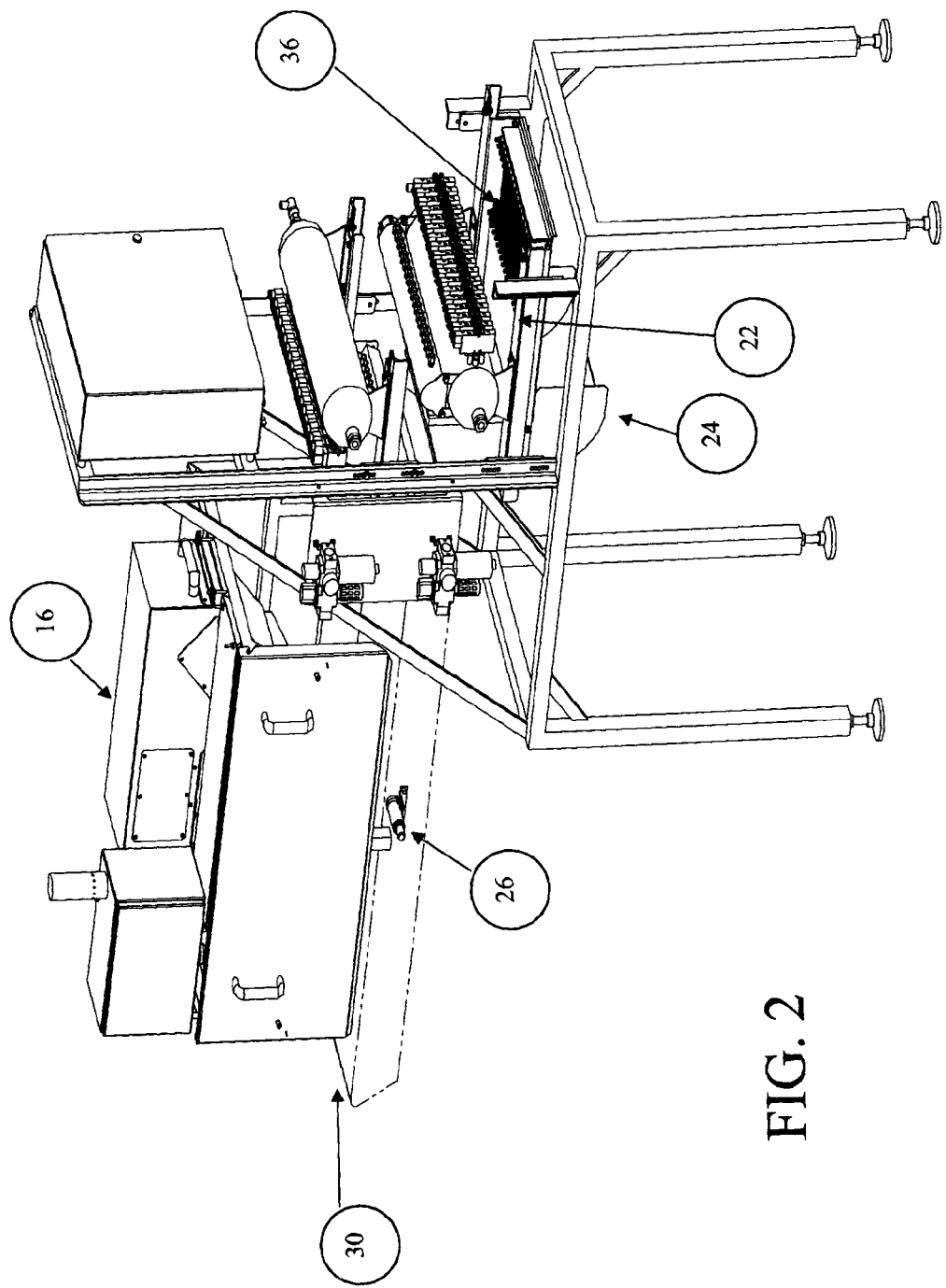
FIG. 2 is a perspective view of the apparatus.
Figure 3:
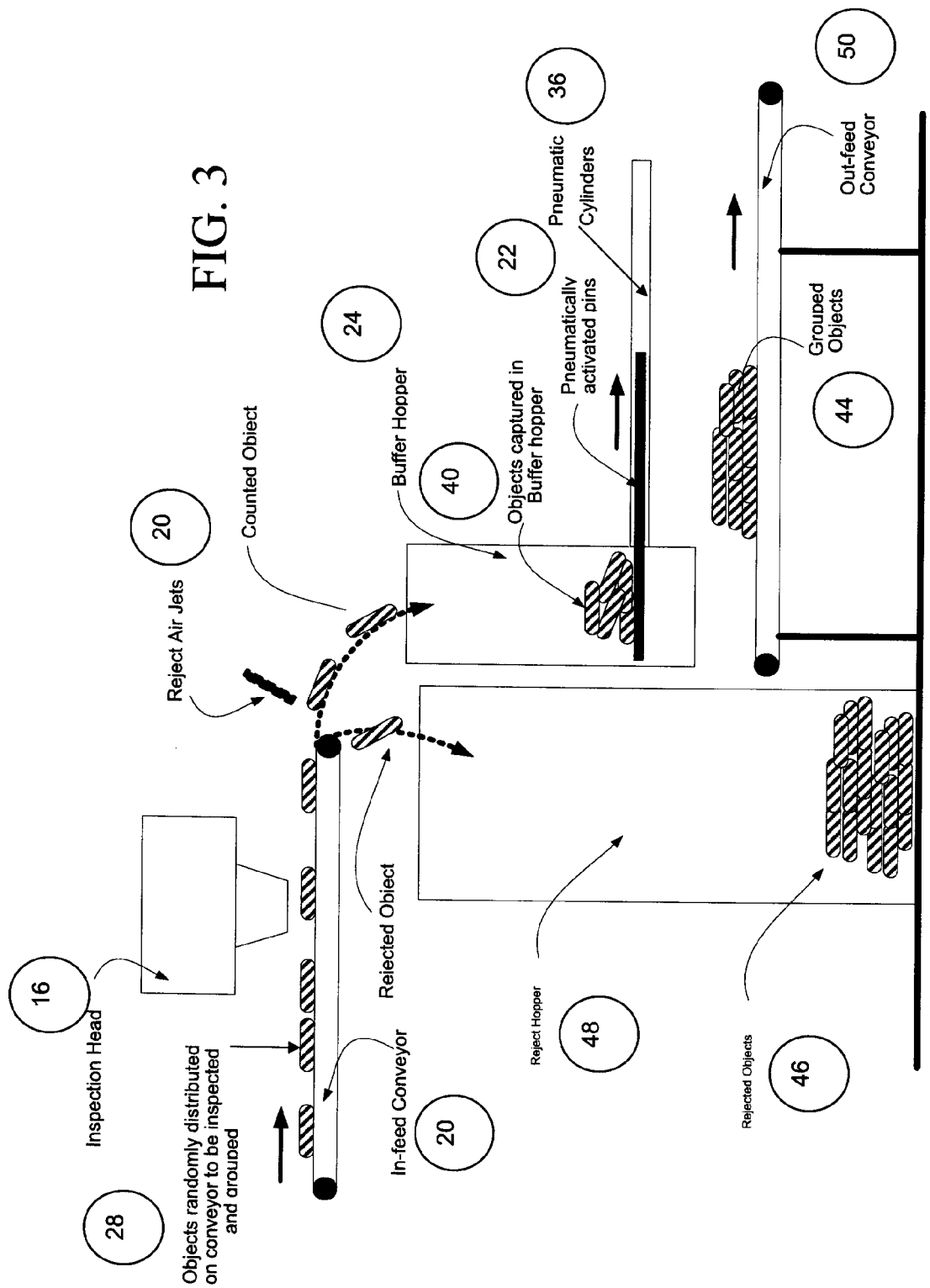
FIG. 3 is a schematic side view of the apparatus depicting it in operation.
Figure 4:
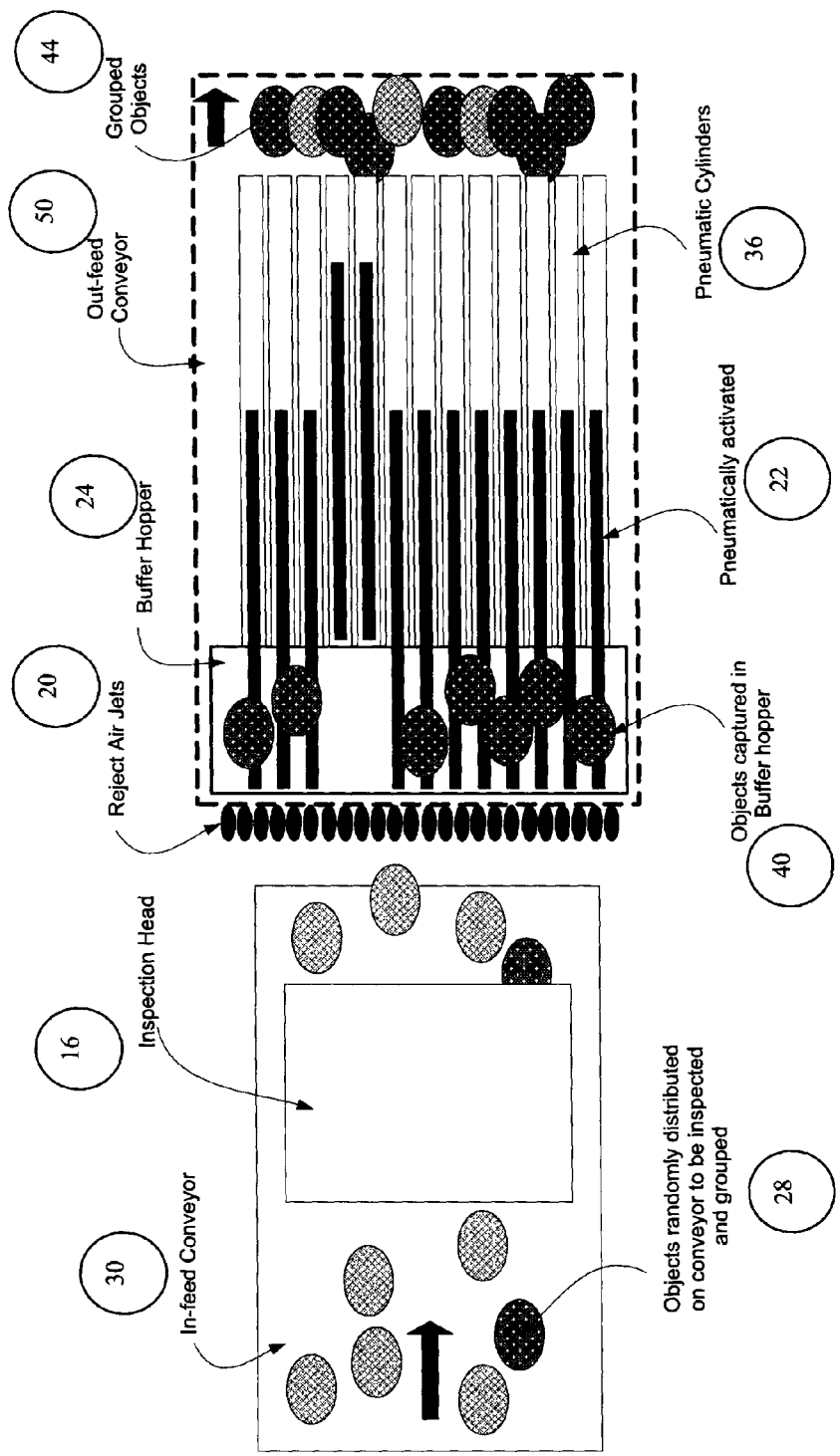
FIG. 4 is a schematic plan view of the apparatus in operation.

FIGS. 1, 2 and 3 an apparatus for sorting articles traveling along a conveyor 30. The conveyor 30 transports articles 28 in a feed direction, which in FIG. 1 is from the left to right. The feed direction is directed from an in-feed end of the conveyor 30 towards an out-feed end of the conveyor 30. Articles travel along the conveyor from an upstream position to a downstream position. The conveyor 30 has a predetermined width that allows a plurality of articles to be located across its width. That is, the articles do not need to be singulated with reference to the feed direction, but rather may be randomly arranged on the conveyor 30 both in terms of the conveyor width and length. The articles may include for example frozen baked goods, dry goods, objects of various materials such as metal or plastic objects etc. The apparatus may also be used to group articles of various sizes. The components of the apparatus may require strengthening or resizing depending on the size of articles being grouped.

Mounted above the conveyor 30 is an inspection head 16, which contains an imaging system including an overhead camera 14, a profile camera 18 and a laser 32. The inspection head 16 is used to scan the conveyor 30 and acquire two dimensional and three dimensional data of articles that passes within the field of view of the cameras 14,18. The field of view of the cameras 14,18 do not need to be focused on the same location of the conveyor 30. Preferably however the field of view of both cameras 14,18 are focused at the same location on the conveyor. This allows for easier correlation of artifacts in the captured image data. Overhead lighting 12 may be used to illuminate articles 28 within the field of view of the overhead camera 14. Back-lighting source 26 may also be used to ensure a good contrast between the articles 28 and the background in the images captured by the cameras 14,18. The profile camera may be used to capture 3-dimensional information. The laser 32 projects a line across articles as the travel through the field of view. The profile camera captures the image of the articles including the laser line that is projected on the articles. The control unit may then process the images in order determine three dimensional information from the profile of the laser in the captured images. The inspection head 16 cooperates with a control unit which receives the image data from the cameras and scan data from the laser and processes it to identify and categorize the articles. The overhead camera 14 and profile camera 18 acquire images of the articles 28 as they pass through the field of view. The image data from the cameras 14,18 is processed by the control unit to identify and categorize the articles. The image data from the profile camera may be used to determine other information of the articles such as, the volume of each article. The volume of the articles may be used to determine an estimated weight of the article based on an approximate density of the articles.

Articles 28 that have been scanned by the inspection head 16 can be "labeled" by the control unit for grouping or rejection. The articles 28 are launched off the end of conveyor 30 into a free fall trajectory. The articles may be launched off the conveyor 30 by the forward momentum of the articles 28. Rejection air jets 20 controlled by the control unit are used to remove any articles 28 that have been labeled by the control unit for rejection. The articles may be labeled for rejection if they are considered to be faulty or out of specification. The control unit identifies the articles location and determines an rejection air jet that will alter the free fall trajectory of the article 28. The control unit also determines when the determined rejection air jet is to be activated in order to alter the trajectory of the article labeled for rejection. The control unit can determine the time for activating the jet based on the location of the article along the length of the conveyor 30 when the image information is acquired and the speed of the conveyor. The rejected articles may be knocked off the free fall trajectory of the articles labeled for grouping by the rejection air jets 20 which knock the rejection articles 28 into a reject hopper 48.

Acceptable articles 28, namely those that will be further grouped and so are not labeled for rejection, continue the free fall ballistic trajectory into the buffer hopper 24 and continue out of the hopper 24 into a container or onto an out-feed conveyor. Articles 28 passing through the buffer hopper 24 may be temporarily held up by one or more pins 22. The plurality of pins are located across the width of the buffer hopper and can be activated individually to provide different sections of the buffer hopper 24. Each of the pins may be in a buffering position wherein the pin will arrest movement of articles that are in alignment with the pin. Each of the pins may alternatively be in a grouping position wherein the articles may pass past the pins to the grouping location such as the container or the out-feed conveyor. For example pins 22 located towards one side of the hopper may be activated to temporarily stop articles on that side of the buffer hopper from passing through to the container or out-feed conveyor. At the same time that pins 22 are preventing articles on the one side of the buffer hopper from passing through pins 22 located on the other side of the buffer hopper can be in an open position that allows articles 28 on that side of the buffer hopper to pass through to the container or the out-feed conveyor. The pins 22 can be activated under the control of the control unit in order to separate the articles 28 traveling on the conveyor 30, and subsequently through the buffer hopper, into subsequent groupings that meet a certain predetermined per group parameter, for example the number of articles per group. The group parameter used to determine the article grouping may be referred to generally as the group cycle quantity, as once the quantity is satisfied (for example either article number, article volume, article weight) a new grouping cycle is started. The group cycle quantity may be satisfied in various ways, for example, if a small number of articles is to be included in each group then it is most likely desirable that each group have that exact number of articles 28. In other cases the group cycle quantity may be satisfied by having at most that quantity in the group or at least that quantity within the group. The group cycle quantity may also have a certain error associated with it, for example if the group cycle quantity is weight, each group may be set to 1 kilogram plus/minus % 10.

When the articles 28 that will satisfy the group cycle quantity (i.e. count, volume or predicted weight) have passed the pins 22 they are activated to separate the article 28 flow into subsequent groups. The activated pins stop the articles that are part of the subsequent group from passing out of the buffer hopper until a new container is in place or the out-feed conveyor has displaced the other group of articles 28.

Articles 28 selected for rejection are diverted by means of the reject air jets 20 from their normal trajectory to the reject hopper 48. When articles are rejected, the control unit may compensate the overall group quantity 44 to account for the loss of the rejected articles from the grouped articles.

Articles meeting the specification are tracked by the control unit using the images captured by the cameras 14, 18 and continue to the buffer hopper 24. When the group cycle quantity is satisfied, the control unit generates a pin activation profile which is used to generate the electrical solenoids 34 for the correct timing and sequence of operation of the pins 22 in order to activate the pins 22 after the articles of the first group have passed in order to separate subsequent articles into the subsequent group. The solenoids then activate the horizontal pneumatic cylinders 36 which in turn linearly slide the pins 22 in a smooth but rapid movement to separate the continually falling articles into the current group and the subsequent group.

While the pins 22 are extended, the buffer hopper 24 acts a holding area or buffer for the articles to create a time gap to enable the container underneath the hopper 24, or out-feed conveyor, to be indexed and replaced by an empty container or empty space of belt. Once the container, or out-feed conveyor, has been positioned, the pins 22 are retracted and the grouping cycle is repeated. When the pins 22 are retracted articles that have been temporarily held up may fall into the container or onto the cleared space of the out-feed conveyor.

Figure 5:
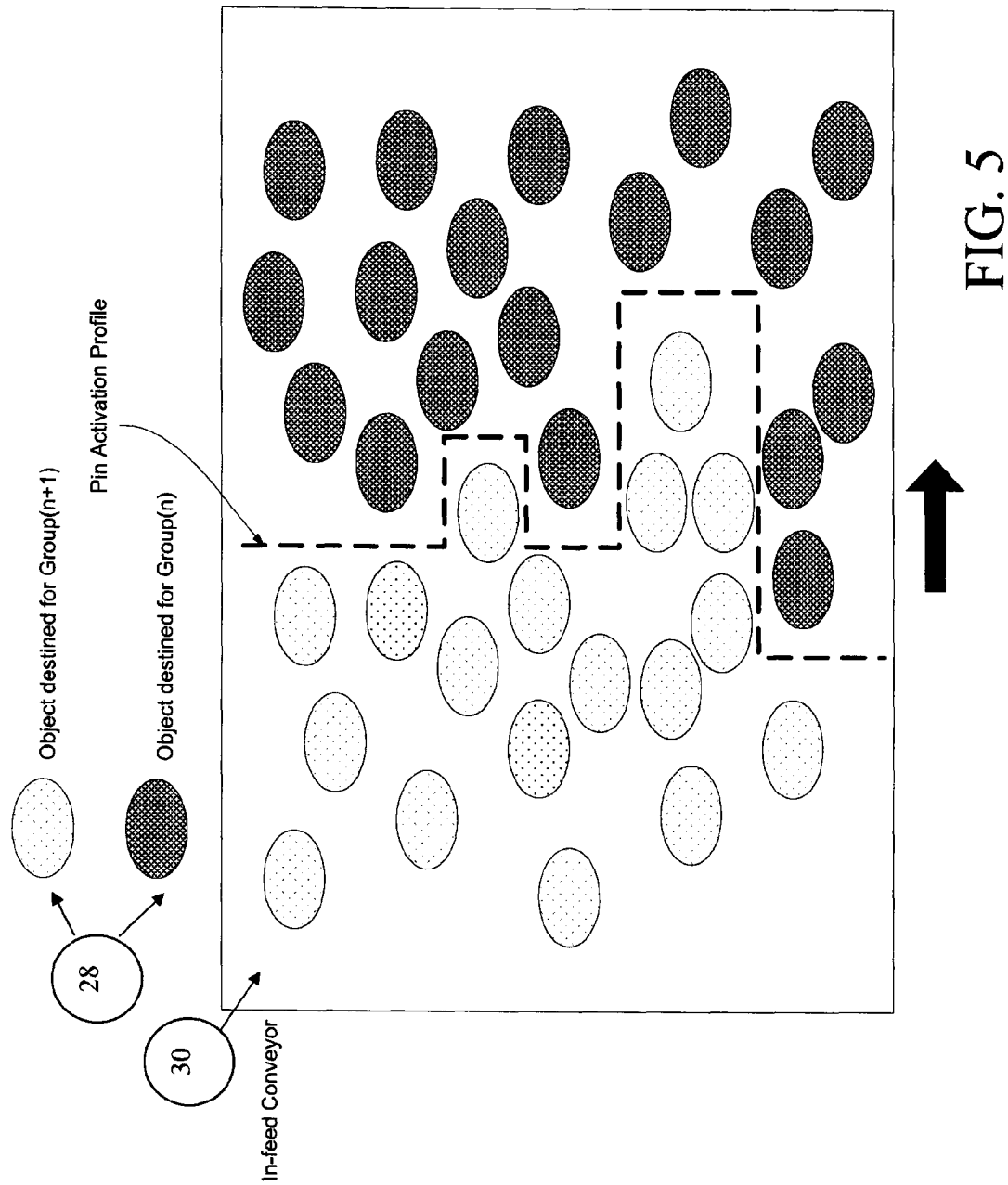
FIG. 5 depicts articles in the field of view of a camera over the conveyor and shows a so-called Pin Activation Profile.

The function of the pin activation profile will now be described with reference to FIG. 5. For the sake of clarity it is assumed that the articles are to be grouped by quantity, with N articles per group. A microprocessor in the control unit or possibly the imaging system, determines when the group cycle count N will be satisfied, by subtracting the number of articles scanned and identified for grouping (i.e. not rejected) from the number selected for the group cycle count, N.

Figure 7A:
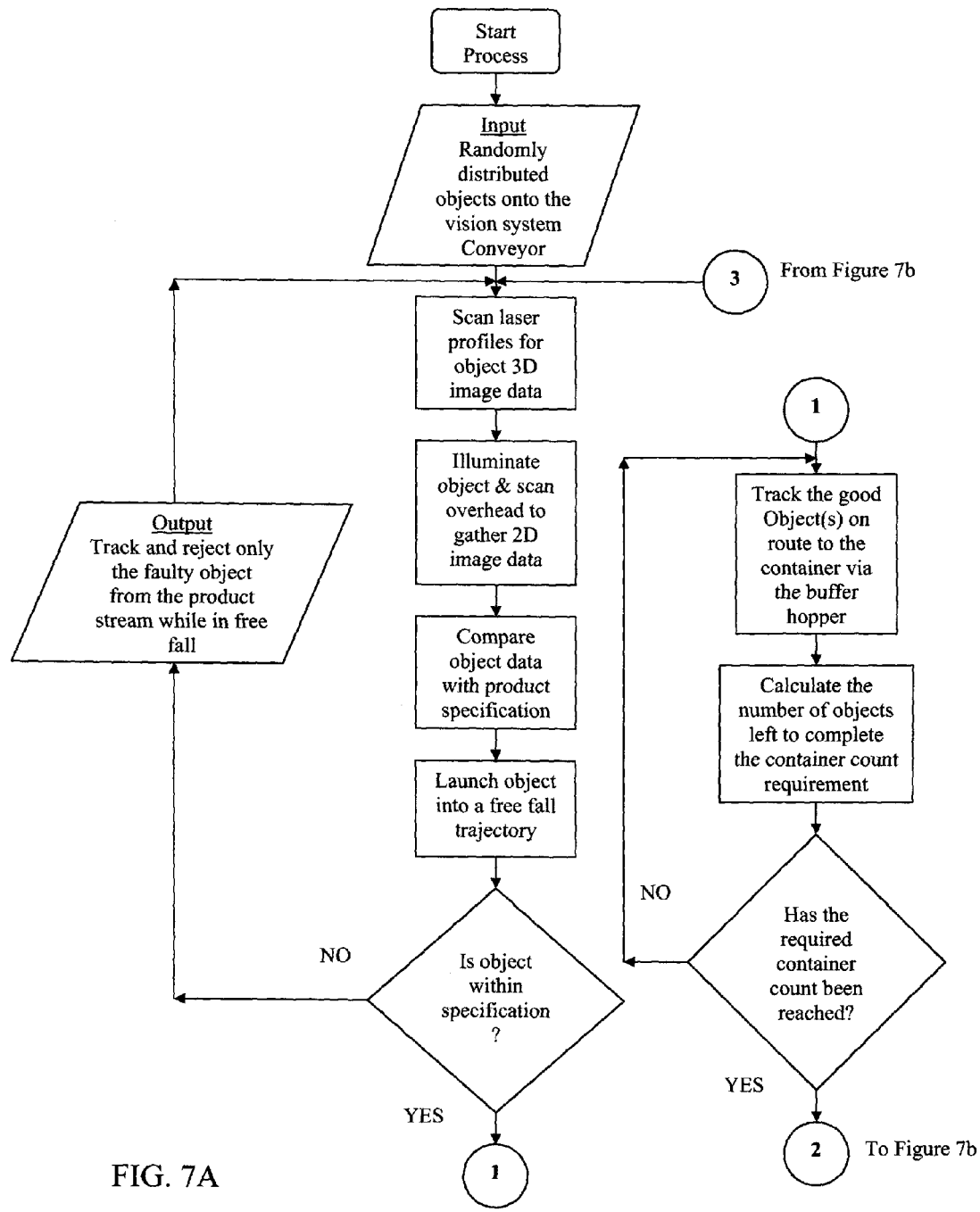
FIGS. 7A and 7B are a flowchart depicting operation of a processor of the apparatus.
Figure 7B:
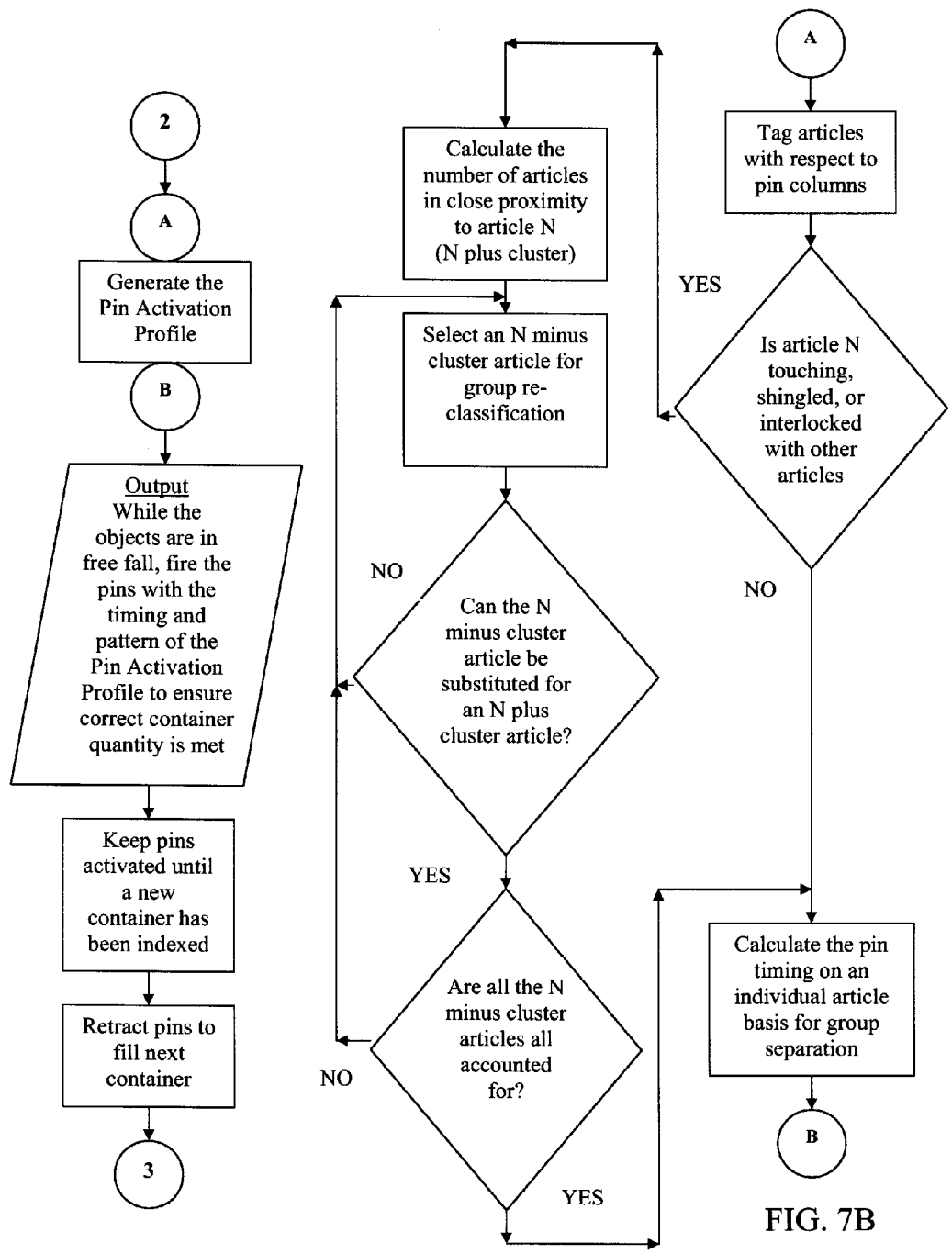

As depicted in the operational flowchart shown in FIGS. 7A and 7B articles are identified and located spatially (by pixels) to identify the lateral position (i.e. its position in the width of the conveyor) of the article and determine a pin or pins that will stop the article from passing through the buffer hopper. The identified articles are also located temporally with respect to the time taken to cover the distance traveled by the identified article from the camera imaging point to the pins 22. As illustrated in FIG. 6, pin columns are the columnar vertical spaces above the pins 22, respectively, such that, if an article is falling within the column it will be directly affected when the pin in that column is energized. The width of each pin column in pixels is determined by the number of pixels covering the width of the conveyor, which is assumed to be the total width of all the pins 22 divided by the number of pins 22.

The control unit may process the image and scan data to identify articles and locate their positions (both spatially and temporally) on the conveyor. The control unit can then categorize the articles 28 into groups. If article N (that is an article that will satisfy the group cycle count) is not touching with others in a cluster, then the processor labels all other articles after N for the subsequent group and calculates the exact time when the last article in the current group will pass the pins 22, and creates the pin activation profile based on this information. When articles categorized for the current group have passed the pins 22, the processor activates the appropriate pins to buffer any articles in those columns destined for the subsequent group, i.e. by storing them temporarily in buffer hopper 24.

If article N is within an assembly of touching and overlapped articles, the processor recalculates available options by locating a segregated article that can be designated as N. If no segregated articles exist, the processor determines how many articles are clustered around article N (N+1, N+2, N+3 etc.). The processor then calculates whether N+1 and N+2 and N+3 etc. are capable of becoming part of the group cycle quantity alongside N and articles N−1, N−2 and N−3 etc. included in a subsequent group (re-categorization). That is if the article under consideration for inclusion in the current group is touching three other articles such that the single article cannot be separated from the other three, the control unit determines if there are three articles that have been already categorized for the current group but can be re-categorized for the subsequent group, i.e. they have not passed the pins 22 of the buffer hopper, and there are no articles behind them that are categorized for the current group.

Thus, the processor determines whether it is possible to re-categorize current articles labeled as N−1, N−2 and N−3. If it is possible, the processor designates N−1, N−2 and N−3 for the subsequent group and N+1, N+2 and N+3 for the current group. If it is not possible, the processor determines an alternative mix of articles to establish the correct quantity; the process then is repeated.

Figure 8A:
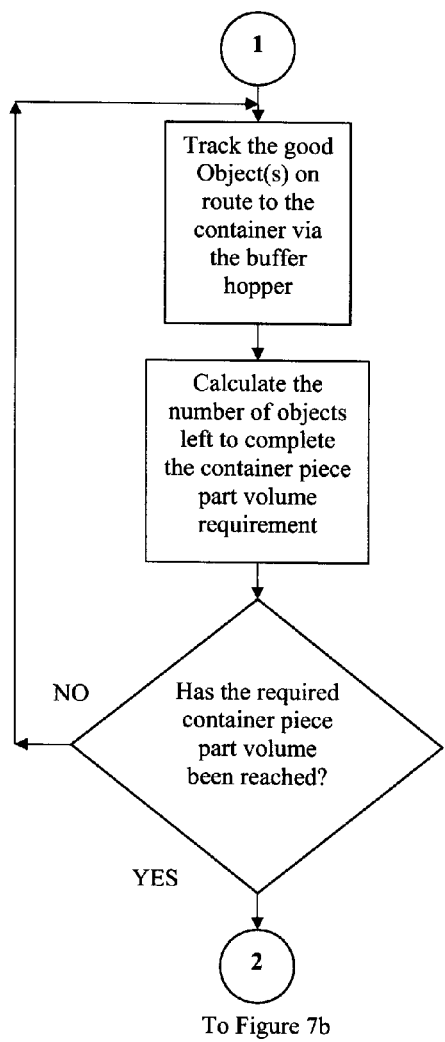
FIGS. 8A and 8B are a flowchart depicting additional operation of a processor of the apparatus.

FIG. 8A depicts the action taken if the desired group cycle quantity is set for volume. The vision portion of the system gathers both 2 dimensional and 3 dimensional data for every article passing through. Once the 2D and 3D data is known, then the volume of each article can be calculated, and this value is then used if the requirement is to fill the containers by article volume. The control unit can be configured, for example by the user or operator, to select the group cycle quantity set point to be in terms of a volume and the containers can be filled until the correct (or greater than) piece part volume is obtained, according the described method.

Figure 8B:
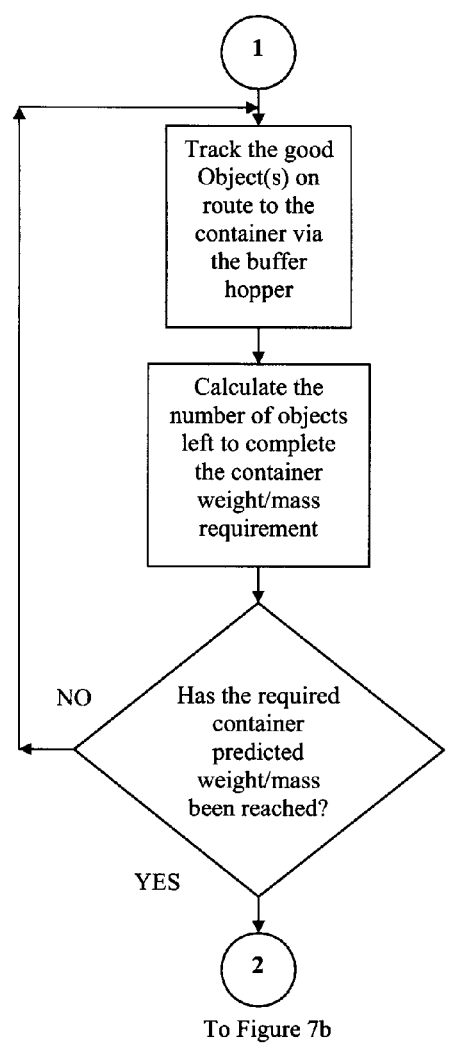

FIG. 8B shows the action taken if the desired group cycle quantity is set for a weight or mass requirement. Since the system is able to calculate the volume of every article, then the weight or mass of each article can predicted if the product density is known. The user or operator may enter a density constant for the product being inspected, and by using this value and the calculated volume, the system, or more particularly the control unit, is able to fill containers by the predicted weight/mass. The user can select the group cycle quantity to be set in terms of a weight or mass and the containers can be filled until the correct (or greater than) weight or mass is obtained, according the described method.

An advantage of embodiments of the invention in which the articles are launched into free fall flight and rejected articles are separated out during such flight is that the articles follow a ballistic trajectory and are accurately tracked by the control and processing means, enabling rejected articles to be distinguished and removed regardless even when a particular rejected article touches, partially overlaps or is interlocked with one or more other articles.

The groups may comprise a selectable number of articles and such articles can be presented to the apparatus with a high proportion of articles touching, partially shingled and interlocked together. As such the articles can be randomly oriented on the conveyor.

The sorting apparatus and methods described herein allow for articles that are randomly oriented on a conveyor to be separated into separate subsequent groups based on a group cycle quantity. Advantageously the system can further identify articles that are to be rejected. Those articles that are to be rejected can be diverted from the grouping articles that are separated into separate subsequent groups, with each of the groups of articles subsequently passing through buffer hopper.

Although an embodiment of the invention has been described and illustrated in detail, it is to be clearly understood that the same is by way of illustration and example only and not to be taken by way of limitation, the scope of the present invention being limited only by the appended claims. It will be apparent that modifications may be made to the described embodiment. For example, the pins used for grouping have been described as arresting movement of articles within the buffer hopper, however, it may be possible to arrange the pins above the conveyor while still maintaining the function of temporarily arresting the movement of articles in alignment with the pin in order to group other articles. Also the rejection system has been described as a air jets arranged to knock the articles labeled for rejection by the control unit into a rejection hopper, however, other types of systems for rejecting or diverting articles could be used. Also the articles need not be knocked into a rejection hopper but may be diverted to a rejection location, such as a container or rejection conveyor.

What is claimed is:

1. An apparatus for grouping randomly oriented articles traveling on a conveyor, said conveyor having an in-feed end, an out-feed end and a predetermined width, the apparatus comprising:
    an inspection head located in a fixed position above the conveyor, the inspection head for capturing images of the articles traveling on the conveyor;
    a grouping unit located in a fixed position relative to the conveyor and downstream of the inspection head, the grouping unit comprising:
        a plurality of individually controllable pins, the individually controllable pins each moveable between a buffering position wherein the pin arrests movement of an article in alignment with the pin and a grouping position wherein the pin allows the article to move to a grouping location; and
    a control unit for receiving and processing the captured images from the inspection head, the processing of the captured images for identifying the location of the articles traveling on the conveyor and for controlling the individual activation of the pins between buffering position and the grouping position,
    wherein the control unit categorizes the articles for including in a current grouping or in a separate subsequent grouping based on a group cycle quantity.

2. The apparatus as claimed in claim 1, wherein the control unit activates the pins in alignment with articles categorized into the current grouping into the grouping position, and wherein the control unit activates the pins in alignment with articles categorized into the separate subsequent grouping into the buffering position before the article passes the pins and after articles categorized into the current grouping have passed the pins.

3. The apparatus as claimed in claim 2, wherein the control unit identifies clusters of articles and rejects the identified cluster of articles or accepts the cluster of articles to satisfy the group cycle quantity.

4. The apparatus as claimed in claim 2, wherein the control unit identifies clusters of articles and re-categorizes the groupings by to satisfy the group cycle quantity by:
    categorizing articles located upstream of the cluster of articles into the current grouping and categorizing the cluster of articles into the separate subsequent grouping; or
    categorizing articles that are between the cluster and the pins into the separate subsequent groupings and categorizing the cluster of articles into the current grouping.

5. An apparatus for grouping randomly oriented articles traveling on a conveyor, said conveyor having an in-feed end, an out-feed end and a predetermined width, the apparatus comprising:
    an inspection head located in a fixed position above the conveyor, the inspection head for capturing images of the articles traveling on the conveyor;
    a grouping unit located in a fixed position relative to the conveyor and downstream of the inspection head, the grouping unit comprising:
        a plurality of individually controllable pins, the individually controllable pins each moveable between a buffering position wherein the pin arrests movement of an article in alignment with the pin and a grouping position wherein the pin allows the article to move to a grouping location; and
    a control unit for receiving and processing the captured images from the inspection head, the processing of the captured images for identifying the location of the articles traveling on the conveyor and for controlling the individual activation of the pins between buffering position and the grouping position,
    wherein the inspection head is located between the in-feed end and the out-feed end, and comprises an overhead camera for capturing the images of the articles as they pass a field of view of the overhead camera,
    wherein the inspection head further comprises a profile camera for capturing additional images of the articles, the additional images used by the control unit in determining 3-dimensional information on the articles traveling on the conveyor,
    wherein the inspection head further comprises a laser source for projecting a line across the articles, the profile camera capturing the projected laser line in the captured additional images, and the control unit processing the image to determine the 3-dimensional information of the articles based on the profile of the captured laser line.

6. The apparatus as claimed in claim 5, further comprising an article rejection system located downstream from the inspection head and upstream from the grouping unit for diverting articles to a rejection location, wherein the control unit labels articles that fail to meet a predetermined specification for rejection based on the captured images, and wherein the control unit further controls the article rejection system to divert the articles labeled for rejection.

7. The apparatus as claimed in claim 6, wherein the article rejection system comprises a plurality of air jets for altering the path of travel of articles.

8. An apparatus for grouping randomly oriented articles traveling on a conveyor, said conveyor having an in-feed end, an out-feed end and a predetermined width, the apparatus comprising:
   an inspection head located in a fixed position above the conveyor, the inspection head for capturing images of the articles traveling on the conveyor;
   a grouping unit located in a fixed position relative to the conveyor and downstream of the inspection head, the grouping unit comprising:
      a plurality of individually controllable pins, the individually controllable pins each moveable between a buffering position wherein the pin arrests movement of an article in alignment with the pin and a grouping position wherein the pin allows the article to move to a grouping location; and
   a control unit for receiving and processing the captured images from the inspection head, the processing of the captured images for identifying the location of the articles traveling on the conveyor and for controlling the individual activation of the pins between buffering position and the grouping position,
   wherein the grouping unit is located adjacent the out-feed end of the conveyor, and comprises a buffer hopper located below the conveyor for temporarily holding articles that have been arrested by the pins in the buffering position.

9. The apparatus as claimed in claim 8, wherein the articles pass through the buffer hopper when pins are in the grouping position.

10. The apparatus as claimed in claim 8, wherein the grouping location is located below the buffer hopper and comprises a container or an out-feed conveyor.

11. The apparatus as claimed in claim 8, wherein the control unit identifies the position of articles on the conveyor spatially and determines the pin that will arrest the article's movement, and wherein the control unit identifies the position of articles on the conveyor temporally to determine when to activate the pin to arrest the article's movement.

12. An apparatus for grouping randomly oriented articles traveling on a conveyor, said conveyor having an in-feed end, an out-feed end and a predetermined width, the apparatus comprising:
   an inspection head located in a fixed position above the conveyor, the inspection head for capturing images of the articles traveling on the conveyor;
   a grouping unit located in a fixed position relative to the conveyor and downstream of the inspection head, the grouping unit comprising:
      a plurality of individually controllable pins, the individually controllable pins each moveable between a buffering position wherein the pin arrests movement of an article in alignment with the pin and a grouping position wherein the pin allows the article to move to a grouping location; and
   a control unit for receiving and processing the captured images from the inspection head, the processing of the captured images for identifying the location of the articles traveling on the conveyor and for controlling the individual activation of the pins between buffering position and the grouping position,
   wherein the control unit processes the images from the inspection head to categorize the articles traveling along the conveyor into separate subsequent groups based on satisfying a group cycle quantity.

13. The apparatus as claimed in claim 12, wherein the group cycle quantity comprises at least one of:
   a number of articles per grouping;
   a total volume of articles per grouping; and
   a total weight of articles per grouping.

14. The apparatus as claimed in claim 1, further comprising an article rejection system located downstream from the inspection head and upstream from the grouping unit for diverting articles to a rejection location, wherein the control unit labels articles that fail to meet a predetermined specification for rejection based on the captured images, and wherein the control unit further controls the article rejection system to divert the articles labeled for rejection.

15. The apparatus as claimed in claim 8, further comprising an article rejection system located downstream from the inspection head and upstream from the grouping unit for diverting articles to a rejection location, wherein the control unit labels articles that fail to meet a predetermined specification for rejection based on the captured images, and wherein the control unit further controls the article rejection system to divert the articles labeled for rejection.

16. The apparatus as claimed in claim 12, further comprising an article rejection system located downstream from the inspection head and upstream from the grouping unit for diverting articles to a rejection location, wherein the control unit labels articles that fail to meet a predetermined specification for rejection based on the captured images, and wherein the control unit further controls the article rejection system to divert the articles labeled for rejection.

17. The apparatus as claimed in claim 1, wherein the control unit identifies the position of articles on the conveyor spatially and determines the pin that will arrest the article's movement, and wherein the control unit identifies the position of articles on the conveyor temporally to determine when to activate the pin to arrest the article's movement.

18. The apparatus as claimed in claim 5, wherein the control unit identifies the position of articles on the conveyor spatially and determines the pin that will arrest the article's movement, and wherein the control unit identifies the position of articles on the conveyor temporally to determine when to activate the pin to arrest the article's movement.

19. The apparatus as claimed in claim 12, wherein the control unit identifies the position of articles on the conveyor spatially and determines the pin that will arrest the article's movement, and wherein the control unit identifies the position of articles on the conveyor temporally to determine when to activate the pin to arrest the article's movement.

* * * * *